United States Patent [19]

Vestberg et al.

[11] Patent Number: 5,300,578
[45] Date of Patent: * Apr. 5, 1994

[54] METHOD FOR PREPARING A VINYL POLYMER-POLYOLEFINE COMPOSITE

[75] Inventors: Torvald Vestberg; Ismo Lehtiniemi, both of Porvoo, Finland

[73] Assignee: Neste Oy, Finland

[*] Notice: The portion of the term of this patent subsequent to Nov. 17, 2009 has been disclaimed.

[21] Appl. No.: 9,772

[22] Filed: Jan. 27, 1993

[30] Foreign Application Priority Data

Jan. 27, 1992 [FI] Finland ............................ 920359

[51] Int. Cl.$^5$ ...................... C08F 2/20; C08F 255/02; C08F 255/04
[52] U.S. Cl. .................... 525/252; 525/253; 525/260; 525/263; 525/285; 525/286; 525/296; 525/302; 525/303; 525/317; 525/322; 525/324; 525/255; 525/290; 525/304
[58] Field of Search ............... 525/302, 324, 285, 286, 525/296, 303, 317, 322, 252, 253, 260, 263, 255, 290, 304

[56] References Cited

U.S. PATENT DOCUMENTS

| | | | |
|---|---|---|---|
| 4,163,383 | 8/1979 | Vander Syde et al. | 73/27 R |
| 4,357,445 | 11/1982 | Steffen et al. | 525/302 |
| 4,412,838 | 11/1983 | Ertl, et al. | 23/302 R |
| 4,412,938 | 11/1983 | Kakizaki et al. | 252/511 |
| 4,806,581 | 2/1989 | Walker | 524/178 |
| 5,045,611 | 9/1991 | McNeil | 526/81 |
| 5,164,456 | 11/1992 | Vestberg et al. | 525/324 |

FOREIGN PATENT DOCUMENTS

| | | |
|---|---|---|
| 0476960 | 3/1992 | European Pat. Off. |
| 2908662 | 9/1979 | Fed. Rep. of Germany |
| 85496 | 3/1991 | Finland |

Primary Examiner—Vasu S. Jagannathan
Attorney, Agent, or Firm—Steinberg, Raskin & Davidson

[57] ABSTRACT

A method for preparing a polyolefine—vinyl polymer composite, wherein about 10–200 parts by weight of vinyl monomer and about 0.01–4.0 parts by weight of a free radical polymerization initiator, based on 100 parts by weight of vinyl monomer, are impregnated in 100 parts of weight of polyolefine particles by slowly mixing these at a temperature of about 20°–130° C. while maintaining the particle structure of the polyolefine. After 50–99% of the amount of the monomer has been absorbed into the polyolefine particles, a water suspension is prepared by adding to the above-mentioned mixture about 80–1000 parts by weight water, based on 100 parts of weight of polyolefine+vinyl monomer, as well as a stabilizing agent. The temperature of the water suspension is then increased for polymerizing the vinyl monomer.

19 Claims, No Drawings

METHOD FOR PREPARING A VINYL POLYMER-POLYOLEFINE COMPOSITE

BACKGROUND OF THE INVENTION

The invention relates to a method for preparing a vinyl polymer-polyolefine composite, in which from about 10 to about 200 parts of weight of vinyl monomer and from about 0.01 to about 4.0 parts of weight of a free radical polymerization initiator, based on 100 parts of weight of vinyl monomer, are impregnated in 100 parts of weight of polyolefine particles by slowly blending these at a temperature from about 20° to about 130° C. without water by maintaining the particle structure of the polyolefine. In this method, from about 80 to about 1000 parts of weight of suspension water are added, based on 100 parts of the combined weight of polyolefine and vinyl monomer, as well as a stabilizing agent. Thereafter, before the temperature of the aqueous suspension is increased in order to polymerize the vinyl monomer.

The present invention further relates to a new way of preparing a polyolefine composite, which can be applied to be used as such and processed into various articles, e.g., as foamed plastic, as compatibilizer, or as a component in semiconducting layers on electric cables. The composite is comprised of a polyolefine and a vinyl polymer, and the invention relates in part to the preparation of this composite by polymerizing the vinyl monomer inside the polyolefine particles.

For improving rigidity, dimensional stability, adhesion properties against other polymers and materials, printability and the like of polyolefines, which are to be worked into various articles or which are to be foamed into foamed plastic, attempts have been made to blend the polyolefine with some vinyl polymer. Because different polymers often are incompatible with each other, it has however appeared to be difficult to achieve homogeneous blends with an attractive appearance and good physical properties.

In order to avoid these problems, attempts have been made to polymerize the vinyl monomer inside the polyolefine particles. Basically two different methods of polymerizing the vinyl monomer in situ in the polyolefine particles have been suggested, and both methods are based on the fact that the vinyl monomer is allowed to diffuse into the polyolefine particles, after which the polymerization of the vinyl monomer occurs. The greatest difference between the two methods is the way in which the vinyl monomer is allowed to diffuse into the polyolefine particles.

West German patent DE 29 08 662 describes the polymerization of styrene in situ in several different polyolefines. In this method, styrene is added slowly into a water suspension containing polyolefine particles at an elevated temperature. Impregnation and polymerization of the styrene occur simultaneously with the result that the polymerization tends to occur more in the surface regions of the polyolefine particles, which results in that the polystyrene is concentrated on the surface layer of the polyolefine particles.

U.S. Pat. No. 4,412,938 describes the polymerization of styrene in situ in an ethylene vinyl acetate copolymer. In this method, all of the styrene is added at a time into a water suspension containing ethylene vinyl acetate copolymer particles. The styrene is added at so low a temperature that no polymerization occurs. Only after all styrene or most of the styrene has diffused into the ethylene vinyl acetate copolymer particles, the temperature is increased and the polymerization starts. A disadvantage of this method is that it is time-consuming because it takes several hours until the styrene has diffused into the ethylene vinyl acetate copolymer particles.

SUMMARY OF THE INVENTION

It is an object of the present invention to prepare a polyolefine-vinyl polymer composite by means of a method, which avoids the problems and disadvantages related to above-mentioned preparation methods.

It is a further object of the present invention to provide a method which incorporates the advantages of the above-mentioned methods, which advantages are that a homogenous blend of the polyolefine and the vinyl polymer is obtained and that the polymerization product is obtained in a particulate form.

In accordance with the above objects and others, in the method of the present invention, a suspension of water and stabilizing agent are added when from about 50 to about 99% of the amount of the vinyl monomer has been absorbed into the polyolefine particles.

After the polyolefine particles have been blended with vinyl monomer and a free radical initiator, the blend is agitated slowly at a temperature at which no decomposition of the initiator and no polymerization occurs, but at which temperature the polyolefine particles are impregnated with the monomer. The impregnation is carried out without water until from about 50 to about 99% of the amount of the monomer has been absorbed in the polyolefine particles. Thereafter the whole amount of the suspension water and stabilizing agent is added. The impregnation then continues a short time in the suspension stage to complete the absorption of the monomer in the polyolefine particles.

In the present method for preparing a polyolefine-vinyl polymer composite, the absorption of the polyolefine may thus be divided into two steps. In the first step the impregnation of from about 50 to about 99% of the vinyl monomer occurs in the absence of water. In the second step the impregnation of the rest of the monomer occurs in the presence of the suspension water. This means that the monomer, in order to be able to penetrate into the polyolefine particles during the first impregnation step, does not have to be transported through any water phase, and the whole impregnation is faster than in the method described in U.S. Pat. No. 4,412,938 (in which the suspension water is present during the whole impregnation). During the impregnation, the polyolefine particles partly swell depending on how much vinyl monomer has been added, but the particulate form of the polyolefine is still maintained.

In Neste Oy's Finnish Patent Application No. FI 894461 (EP 418861) a method is described for preparing a polyolefine-vinyl polymer composite, in which method the whole impregnation, the impregnation of 100% of the vinyl monomer into the polyolefine particles occurs in the absence of water. In comparison with Neste Oy's Finnish Patent Application No. FI 894461, the present method has two advantages. First, the power demand of the agitator motor is lower, since the suspension water is added in the second step of the impregnation. Hereby the peak power demand is avoided which otherwise is existing at the end of the impregnation when the whole monomer amount has been absorbed in the polyolefine particles. Second, there is no risk for the particle to decompose in the end of the impregnation as the suspension water is present.

Neste Oy's Finnish Patent Application No. FI 904586 (EP 476960) describes a method for preparation of polyolefine vinyl polymer composite in which a little amount of water is added during the impregnation. In comparison with FI 904586, the method of the present invention has the advantage that it is more simple to carry out in the practice because all the suspension water is added at the same time.

DETAILED DESCRIPTION

Polyolefines which may be used in conjunction with the present invention include high density polyethylene, low density polyethylene and linear low density polyethylene. The polyethylene can be a homopolymer or a copolymer. The comonomer for ethylene can be, e.g., vinyl acetate, vinyl chloride, propene or some other $\alpha$-olefin, $C_1$–$C_7$-alkyl acrylates and -methacrylates, acrylic acid and -methacrylic acid, hydroxy alkyl acrylates and -methacrylates, glycidylacrylate and -methacrylate, dienes such as hexadiene-1,4, hexadiene-1,5, heptadiene-1,6, 2-methyl pentadiene-1,4, octadiene-1,7, 6-methyl heptadiene-1,5 and polyenes such as octatriene and dicyclo pentadiene. Also, ethylene-$\alpha$-olefine-polyene-terpolymers are useful. Useful $\alpha$-olefines include propylene, butene, pentene, isofrene, hexene or their mixtures, and useful polyenes include hexadiene-1,4, hexadiene-1,5, heptadiene-1,6, 2-methyl pentadiene-1,4, octadiene-1,7, 6-methyl heptadiene-1,5, octatriene, dicyclo pentadiene. When the ethylene polymer is a copolymer, the proportion of the ethylene in the copolymer must be at least 50% by weight.

The polyolefine can also be comprised of polypropylene and its copolymer. The propene polymers can consist of more than 50% by weight propylene and can be a random or block copolymer of propylene and ethylene. Also other $\alpha$-olefines can be comonomers and also dienes as hexadiene-1,4, hexadiene-1,5, heptadiene-1,6, 2-methyl pentadiene-1,4, octadiene-1,7, 6-methyl heptadiene-1,5 and polyenes as octariene and dicyclo pentadiene.

The polyolefine must be in a particulate form with a particle size of from about 0.5 to about 10 mm, most preferably from about 1 to about 6 mm. When the polyolefine is in a particulate form, it is easy to achieve a good agitation during the impregnation phase, which is a precondition for the fact that the concentration of the vinyl monomer becomes the same in all polyolefine particles. If the particles are too large, it may be difficult to keep the suspension stable during the final step of the polymerization. Stability problems can also occur in connection with small particles.

Any vinyl monomers which can be polymerized with free radical polymerization technique are suitable to be used as vinyl monomers in the present invention. Examples of such vinyl monomers are styrene, substituted styrenes such as methyl styrene, isopropyl styrene, chloro styrene, $\alpha$-methyl styrene and $\alpha$-ethyl styrene, $C_1$–$C_{10}$-alkyl acrylates and methacrylates, hydroxy alkyl acrylates and methacrylates, glycidyl acrylate, glycidyl methacrylate, acrylo nitrile, methacrylonitrile, vinyl halides, malein anhydrides, acrylic acid, methacrylic acid, acrylic amide, methacrylic amide, vinyl acetate and other alkylates. These vinyl monomers can be used separately or mixed with each other.

If it is desired to crosslink the vinyl comonomer, a minor amount of another comonomer can be used containing two or more double bonds. The amount of that comonomer with two or more double bonds is from about 0.01 to about 10% by weight of the total amount of vinyl monomer. Suitable monomers with two or more double bonds are, for example, divinyl benzene, diacrylates such as 1,4-butanediol dimethacrylate and 1,2-butenediol dimethacrylate and di-cyclo pentadiene.

The quantity of the vinyl monomer to be polymerized in the polyolefine matrix is from about 10 to about 200 parts of weight, based on 100 parts of weight of polyolefine. A larger quantity of vinyl monomer than about 200 parts of weight causes problems such that it is difficult to keep the polyolefine in a particulate form during the impregnation; the particles tend to agglomerate and form a homogenous phase. It is not appropriate to add a smaller quantity of vinyl monomer than about 10 parts of weight, since such quantities of vinyl monomer provide only small changes in the properties of the initial polyolefine.

Initiators, which are used for polymerizing the vinyl monomer, are initiators, which are conventionally used in the suspension polymerization and include organic peroxides, such as benzoyl peroxide, lauroyl peroxide, t-butyl perbenzoate, t-butyl-peroxy-2-ethyl hexanate, t-butyl peroxide, dikumyl peroxide, di-t-butyl peroxide, bis(t-butyl peroxisopropyl)benzene, t-butyl peroxyisopropyl carbonate, as well as azo compounds, such as azobisisobutyronitrile and azobis-dimethyl valeronitrile.

More than one initiator are preferably used simultaneously so that the polymerization starts at a low temperature with a low-temperature initiator and is completed at a high temperature with a high-temperature initiator. The total amounts of the initiator may be from about 0.01 to about 4 parts of weight, most preferably from about 0.1 to about 1.2 parts of weight, based on 100 parts by weight of vinyl monomer.

The impregnation is started so that polyolefine particles, vinyl monomer and initiators are added to a reactor in any order. If the initiator or the initiators are in powder form they are suitable dissolved in a part of or the whole amount of the vinyl monomer to be sure of that the amount of initiator is the same in the different polyolefine particles. For the same reason, the liquid initiators can be mixed with the vinyl monomer before they are mixed with the polyolefine particles.

The temperature during the impregnation is from about 20° to about 130° C. depending on the type of polyolefine and vinyl monomer, e.g., depending on how easily the vinyl monomer penetrates into the polyolefine. The impregnation temperature is preferably low enough that substantially no polymerization occurs during the impregnation phase. The impregnation temperature must thus be observed when selecting the initiator.

The impregnation generally lasts for about 0.2 to about 3.0 hours depending on how easily the vinyl monomer penetrates into the polyolefine particles and depending on whether the impregnation has been performed at an elevated temperature or not. It is not necessary to perform the impregnation in the same reactor as the polymerization.

Thereafter, the absorption of the vinyl monomer into the polyolefine particles is carried out in two steps. During the first step the impregnation is carried out totally in the absence of water until from about 50 to about 99% of the vinyl monomer has been absorbed. To distribute the vinyl monomer uniformly between the polyolefine particles the pellets and vinyl monomer should be well mixed during the first impregnation step. The agitation rate (expressed as the end speed of the agitator) is not critical, but most preferably it is in the range of from about 0.1 to about 1.0 m/s. If the agitation rate is too low, the vinyl monomer can be unequally distributed between the polyolefine particles. In certain cases, at the end of the impregnation step the agitation of the particles worsens depending on the agitator system, amount of vinyl monomer and the polyolefine-vinyl monomer couple in question when from about 50 to about 99% of the vinyl monomer has been absorbed in the polyolefine particles. In this stage of the impregnation the whole amount of the suspension water and stabilisator is preferably added to be sur that the vinyl monomer is distributed uniformly between the polyolefine pellets. Thereafter, the second impregnation step begins during which the rest of the amount of the vinyl monomer is absorbed into the polyolefine particles.

When from about 50 to about 99% of the vinyl monomer amount has been absorbed in the polyolefine particles the whole amount of suspension water and suspending agent are added and the agitation rate is increased to values usual in connection with suspension polymerization. In other words, the agitation rate is increased to such values that it is possible to maintain a good agitation in the reactor and to keep the suspension stable.

Substances useful as suspending agents in the present invention include those which are normally used in suspension polymerization of vinyl monomers. These include, e.g., water soluble polymers, such as polyvinyl alcohol, polyvinyl pyrrolidone and methyl cellulose, or partially water soluble substances, such as calcium triphosphate and magnesium pyrophosphate.

The total amount of suspension water is not critical, but it must be so large that the suspension is maintained during the polymerization. Preferably, from about 80 to about 1000 parts of weight of suspension water, and more preferably from about 100 to about 500 parts by weight water is included per 100 parts by weight of polyolefine and vinyl monomer.

If the first impregnation step has been performed at an elevated temperature the water is preferably heated to the same temperature, before it is blended with the polyolefine particles swollen by the vinyl monomer. This to prevent the part of the vinyl monomer which has been absorbed into the polyolefine particles from diffusing out of the polyolefine particles due to the sudden decrease in the temperature in the case where the temperature of the water added is lower than the temperature of the polyolefine impregnated with the vinyl monomer. Time is saved at the same time because no time is wasted to warm up the water in the reactor.

After the suspension water and the stabilizer have been added to the reactor, the impregnation continues at the same temperature as before the addition of the water for a maximum of about 1.5 hours to allow the remainder of the amount of the vinyl monomer, from about 1 to about 50% of the initial amount of vinyl monomer, to be absorbed into the polyolefine pellets.

The polymerization of the vinyl monomer which has been absorbed into the polyolefine particles occurs by raising the temperature in the agitated reactor, whereby the initiator decomposes and initiates the polymerization. The polymerization can be performed at one or more temperatures within the temperature range from about 50° to about 150° C. The polymerization generally lasts from about 5 to about 20 hours.

After the polymerization has been completed, the reactor is cooled and the product is then finished in a way normal in suspension polymerizations (e.g., washing and drying), and it is then ready for further treatment.

The polyolefine particles retain their particle form during the polymerization. In comparison with the original polyolefine particles, the particles are after the polymerization only slightly larger depending on the absorbed and polymerized vinyl monomer.

The polymerization product provides a homogenous impression and is esthetically attractive. The vinyl polymer polymerized in the polyolefine particle is distributed on pearls of a size from about 0.05 to about 2.0 $\mu$m, which are homogenously distributed in the polyolefine matrix. The concentration of the vinyl monomer is as high in the middle as in the outer regions of the particle, as determined by infrared microscopy.

Since the vinyl monomer is polymerized inside the polyolefine particle, part of the polymerized vinyl monomer is in the form of a homopolymer and part in a form grafted on the polyolefine. Even though the share of the grafted vinyl polymer in some cases is smaller than the share of the homopolymer, its existence is important for the morphological stability of the composite during processing.

A feature of this invention is that the morphology of the composite remains unchanged after treatment, i.e. that the vinyl polymer remains in the form of a pearl with a size of from about 0.05 to about 2.0 $\mu$m homogenously distributed in the polyolefine matrix.

If the polyolefin is modified with vinyl monomers, the polymers of which have high glass transition temperature, as for example styrene and methyl methacrylate, the hardness, rigidity and resistance of the polyolefine can be increased. If the polyolefine is modified with vinyl monomers, with rubber-like polymers the polyolefine can be made more elastic.

Polymer composites prepared according to this invention can be used in many different ways, mainly depending on the type of polyolefine and vinyl monomer used as well as their mutual proportions.

Accordingly, it is possible to increase the mechanical strength of many polyolefines by polymerizing in situ a vinyl monomer inside the polyolefine. Also, the hardness and rigidity on the ethylene vinyl acetate copolymer and polypropene can be increased by polymerizing styrene into the same in situ. These composites can be used as such and processed into various articles. The composites can also be blended with other thermoplasts, whereby the resultant composite has the abovementioned advantages.

Ethylene vinyl acetate copolymer - polystyrene composites can be impregnated with some conventional volatile media, such as iso- or n-pentane, and thereafter expanded with water vapor into foamed plastic. Such a foamed plastic has better elastic properties and a better resistance to chemicals than polystyrene foam.

Polypropene-polystyrene composite films prepared according to this invention can be stretched in one or two directions and then used as synthetic paper.

Ethylene vinyl acetate copolymer - polystyrene composites can be one component in the semiconducting layer of electric cables, which are thereby easy to strip from the cable during coupling work.

The adhesion of the polyolefine and also other polymers and materials to itself can be changed by modifying a polyolefine in this way, which can be used in connection with peelable seal applications in for example lids of yoghurt packages and different plastic bag packages.

A further application for these modified polyolefines is as compatibilizers. For example, if polyolefine A is grafted with vinyl polymer B, this grafted polyolefine A-B can work as a compatibilizer between polyolefine A and vinyl polymer B.

DETAILED DESCRIPTION OF THE PREFERRED EMBODIMENTS

The following examples illustrate various aspects of the present invention. They are not to be construed to limit the claims in any manner whatsoever.

EXAMPLE 1

50 parts of weight (1000 g) of ethylene vinyl acetate particles with a diameter of 3 to about 4 mm were added into a 10-liter reactor. The ethylene vinyl acetate copolymer was Atochem's product Evatone and contained 28% by weight of vinyl acetate and its melt index was 5 g/10 min, measured with 2.16 kg and at 190° C. 50 parts of weight of 2-ethyl hexyl acrylate and as initiator 0.135 parts of weight of azobisisobutyronitrile (AIBN) and 0.130 parts of weight of benzyl peroxide (BPO) were then added. Before the addition of the monomer and the initiators to the reactor, the reactor and the monomer solution were rinsed with nitrogen. The impregnation was carried out at 40° C. with an agitation rate of 30 rpm. After 50 minutes, about 90% of the monomer has been absorbed. Thereafter 290 parts by weight water, 1 part by weight tricalcium phosphate as stabilizer and 0.03 parts by weight of sodium dodecylbenzene sulphonate were added. The water addition is carried in two steps of approximately equal amounts with the suspension agent in the first one. Before the water was added to the reactor it had been bubbled through with nitrogen. The agitation rate was raised to 200 rpm. The temperature of the reactor was thereafter increased in 20 minutes to 55° C. which maintained in 3 hours. Thereafter the temperature was increased to 90° C. in 8 hours which was maintained in 7 hours. After cooling, the reactor was emptied and the EVA-poly(2-ethylhexyl acrylate) particles with the size of 4 to about 5 mm was washed and dried. The particles were homogeneous and almost transparent. By means of transmission electron microscope (TEM), it was determined that the poly(2-ethylhexyl acrylate) was dispersed in form of large pearls of the size of 0.1 μm in the EVA matrix. The product was very elastic and rubberlike. The melt index of the product is about 1.0 g/10 min. at 230° C. and 15 kg.

EXAMPLE 2

Example 2 was carried out in accordance with Example 1 with the difference that the monomer was a mix of 36.5 parts of weight of methyl metacrylate and 13.5 parts of weight of styrene. The initiators used were 0.150 parts of weight of AIBN, 0.10 parts of weight of BPO and 0.075 parts of weight of tert-butyl peroxy perbenzoate (t-BPB). After 65 minutes about 90% of the monomer has been absorbed in the EVA particles. Thereafter, the suspension water was added. After a further 20 minutes, the temperature was raised to 55° C. and the polymerization was accomplished in the same way as in Example 1 with the difference that the temperature at the end of the polymerization was raised to 260° C. in 4 hours. The separate and homogeneous product particles had an opaque appearance and were much harder than the initial EVA. By means of TEM, it was determined that poly(methyl metacrylate styrene) is dispersed in form of about 0.2 μm big pearls in the EVA matrix. The melt index of the product is 0.2 g/10 min. at 260° C. and 5 kg.

EXAMPLE 3

50 parts by weight (25 kg) of EVA pellets with the diameter 3 to about 4 mm were added to a 200 liter reactor. The EVA was Neste Oy's commercial quality NCPE 5028, containing 28% by weight of vinyl acetate with a melt index of 5 g/10 min. at 190° C. and 2.16 kg. 50 parts of weight of styrene and as initiator 0.58 parts of weight of dicetyl peroxy carbonate (d-CPK), 0.13 parts of weight of BPO and 0.050 parts of weight of t-BPB was added to the reactor. The agitation rate was 40 rpm and the temperature 30° C. during the impregnation. After 20 minutes about 60% of the monomer has been absorbed in the EVA pellets. Thereafter 210 parts of weight of water is added and the same stabilizer as in Example 1 and the agitation rate was raised to 105 rpm. After a further 40 minutes at this temperature, the temperature is increased to 55° C. to start the polymerization. Thereafter the temperature is increased in 6 hours to 60° C. and is maintained for 2.5 hours. Thereafter the temperature is raised to 130° C. for 3 hours. The product particles with the size of 4 to about 6 mm are free flowing homogeneous and white. By means of TEM, it was determined that the polystyrene is dispersed in form of about 0.3 μm pearls in the EVA matrix. By means of microscope IR, it was determined that the amount of polystyrene is the same in different parts of weight of the EVA pellets (50%±2%) and that the polystyrene concentration does not vary between different EVA pellets. The melt index of the product was 1.6 g/10 min.

EXAMPLE 4

Example 4 was carried out in similar fashion to Example 3 with the difference that EVA contained 18% by weight vinyl acetate and the melt index was 2 g/10 min , 190° C. and 2.16 kg. 0.040 parts of weight of azobisisobutyronitrile (AIBN), 0.31 parts of weight of BPO and 0.050 parts of weight of t-BPB were used as initiators. After that the styrene had been absorbed to about 60% at the temperature 40° to about 50° C. during 30 minutes, water and suspension agent was added and the impregnation thereafter was allowed to continue in 1.5 hours at 50° C. The polymerization was done at 70° C. during 1 hour at 70° to about 90° C. during 3 hours, at 90° C. during 3 hours and finally at 130° C. during 3 hours. The product was stated to have the same structure and appearance as in Example 3 and its melt index was 0.3 g/10 min.

EXAMPLE 5

This example was carried out in accordance with Example 4 with the difference that the polyolefine was Neste's commercial product NCPE 0469. This quality is a terpolymer containing 80% of ethylene and butyl acrylate and 2-hydroxy ethyl methacrylate. The polymerization was done in a 22 liter reactor why the amounts of the different materials is 8 times smaller than in Example 4. The product particles are free, homogeneous and white.

EXAMPLE 6

This example was carried out as Example 5 with the difference that the polyolefine was the commercial quality NCPE 5010 of Neste Oy containing 9% by weight vinyl acetate with the melt index of 8 g/10 min. The initiator used was 0.25 parts of weight of BPO and 0.04 parts of weight of t-BPB. After 80 minutes impregnation starting at 20° C. and ending at 70° C., about 90% of the monomer had been impregnated whereafter the water and the suspension agent was added. The impregnation was allowed to continue for further 1 hour at 70° C. whereafter the temperature was raised to 80° C. for 1 hour, 90° C. for 4 hours and finally 130° C. for 3 hours. The product particles are free flowing, homogeneous and white.

EXAMPLE 7

50 parts of weight, 1000 g of polypropene (PP) in pellet form was added to a 10 liter reactor with a diameter of 3–4 mm. The polypropylene was Neste's commercial quality XB 8050 E which contains 3% of ethylene and has the melt index of 8 g/10 min., 230° C. and 216 kg. Thereafter 50 parts of weight of styrene was added, in which styrene 0.2 parts of weight of t-BPB had been dissolved as initiator. After 45 minutes impregnation at 100° C. ca 95% of the monomer blend had been absorbed in the PP. After addition of water and suspension agent the same mount as in Example 1, the temperature is raised until 110° C. for 4 hours and thereafter to 120° C. for 2 hours and finally to 130° C. for 2 hours. The 4 to about 6 mm size product pellets are free flowing, homogeneous nd white. With TEM it was stated that the polystyrene is dispersed as 0.3 $\mu$m big pearls in the PP matrix. The melt index of the product is 2.9 g/10 min.

EXAMPLE 8

50 parts of weight, 750 g of polypropene in pellet form was added to a 10 liter reactor with the diameter of 3 to about 4 mm. PP was Neste's commercial quality XB 1851, containing 3% of ethylene and with a melt index 1.8 g/10 min., 230° C. and 2.16 kg. Thereafter 50 parts of weight of butyl acrylate was added, in which 0.2 parts of weight of dicumyl peroxide had been dissolved as initiator. After 1 hour impregnation at 105° C., about 95% of the monomer mixture had been absorbed in the PP pellets. After addition of water and suspension agent, the same amount as in Example 1, the temperature was raised to 120° C. during 1 hour to let the last rests of the monomer and the initiator to be absorbed in the pellets. After 4 hours at 120° C. the temperature was raised to 130° C. for 1 hour and thereafter 140 for 1 hour. The product pellets are free flowing, homogeneous and white.

The examples provided above are not meant to be exclusive. Many other variations of the present invention would be obvious to those skilled in the art, and are contemplated to be within the scope of the appended claims.

We claim:

1. A method for preparing a polyolefine-vinyl polymer composite, comprising:
   impregnating vinyl monomer and a free radical polymerization initiator into polyolefine particles by slowly blending from about 10 to about 200 parts by weight vinyl monomer, from about 0.01 to about 4 parts by weight free radical polymerization initiator, based upon 100 parts by weight vinyl monomer, and 100 parts by weight polyolefine particles at a temperature from about 20° to about 130° C. in the absence of water and while maintaining the particle structure of the polyolefine,
   adding a suspending agent and from about 80 to about 1000 parts by weight water based on 100 parts by weight of polyolefine and vinyl monomer, when from about 50 to about 99% of the amount of the vinyl monomer has been absorbed in the polyolefine particles, and thereafter
   polymerizing the vinyl monomer by increasing the temperature of the suspension.

2. The method according to claim 1, wherein the polyolefine is a polyethylene or an ethylene copolymer containing more than about 50% by weight ethylene.

3. The method according to claim 2, wherein a comonomer for ethylene comprises vinyl acetate, an $\alpha$-olefine, acrylic or methacrylic acids or esters, hydroxy alkyl acrylate and methacrylates, glycidylacrylate, dienes, alkyl acrylate and methacrylates, glycidyl acrylate, dienes, polyenes or vinyl chloride.

4. The method according to claim 1, wherein the polyolefine is a polypropene or a propylene copolymer containing more than 50% by weight propene.

5. The method according to claim 4, wherein the polyolefine further comprises a comonomer which is a polar unsaturated monomer.

6. The method according to claim 4, wherein the polyolefine further comprises a comonomer which is an $\alpha$-olefine.

7. The method according to claim 4, wherein the polyolefine further comprises an ethylene comonomer.

8. The method according to claim 1, wherein the diameter of the polyolefine particles is from about 0.5 to about 10 mm.

9. The method according to claim 1, wherein the vinyl monomer can be polymerized by a free radical polymerization technique.

10. The method according to claim 9, wherein the vinyl monomer is selected from the group consisting of styrene, substituted styrenes, $C_1$–$C_{10}$ alkyl acrylates and methacrylates, hydroxy alkyl acrylates and methacrylates, glycidyl acrylate, glycidyl methacrylate, acrylo nitrile, methacrylo nitrile, vinyl halides, maleic anhydride, acrylic acid, methacrylic acid, acryl amide, methacrylamide, vinyl acetate, and mixtures of any of the foregoing.

11. The method according to claim 1, further comprising cross-linking the vinyl monomer by adding from about 0.01 to about 10% by weight, based on the total amount of the vinyl comonomer, of a comonomer having at least two double bonds.

12. The method according to claim 11, wherein said comonomer having at least two double bonds is selected from the group consisting of divinyl benzene, diacrylates, dimethacrylates and dicyclopentadiene.

13. The method according to claim 1, wherein the initiator is an organic free radical polymerization initiator.

14. The method according to claim 13, wherein the initiator is selected form the group consisting of a peroxide, an azo compound, benzoyl peroxide, lauroyl peroxide, t-butyl peroxybenzoate, dicumyl peroxide and azobis-isobutyronitrile.

15. The method according to claim 1, further comprising conducting the polymerization of the vinyl monomer at a temperature of from about 50° to about 150° C.

16. The method according to claim 1, wherein the vinyl monomer is polymerized inside the polyolefine particles such that the vinyl polymer is homogenously dispersed as round pearls with a size from about 0.05 to about 2.0 μm in a polyolefine matrix.

17. The method according to claim 1, wherein the suspending agent is a water soluble polymer.

18. The method according to claim 17, wherein said water soluble polymer is selected from the group consisting of polyvinyl alcohol, polyvinyl pyrrolidone and methyl cellulose.

19. The method according to claim 1, wherein the suspending agent is calcium triphosphate or magnesium pyrophosphate.

* * * * *